US007679492B2

(12) United States Patent
Kuhn

(10) Patent No.: US 7,679,492 B2
(45) Date of Patent: Mar. 16, 2010

(54) SECURITY SYSTEM, IN PARTICULAR IN A MOTOR VEHICLE

(75) Inventor: Michael Harald Kuhn, Hamburg (DE)

(73) Assignee: NXP B.V., Eindhoven (NL)

( * ) Notice: Subject to any disclaimer, the term of this patent is extended or adjusted under 35 U.S.C. 154(b) by 765 days.

(21) Appl. No.: 10/587,595

(22) PCT Filed: Jan. 18, 2005

(86) PCT No.: PCT/IB2005/050204

§ 371 (c)(1),
(2), (4) Date: Jul. 27, 2006

(87) PCT Pub. No.: WO2005/073928

PCT Pub. Date: Aug. 11, 2005

(65) Prior Publication Data

US 2007/0188300 A1 Aug. 16, 2007

(30) Foreign Application Priority Data

Jan. 29, 2004 (EP) .................................. 04100313

(51) Int. Cl.
*B60R 25/10* (2006.01)

(52) U.S. Cl. .................... 340/426.36; 340/5.1; 340/5.2; 340/5.7; 340/5.72

(58) Field of Classification Search ............ 340/426.36, 340/5.1, 5.2, 5.7, 5.72
See application file for complete search history.

(56) References Cited

U.S. PATENT DOCUMENTS

| | | | | |
|---|---|---|---|---|
| 5,561,420 | A * | 10/1996 | Kleefeldt et al. | 340/5.26 |
| 6,323,566 | B1 * | 11/2001 | Meier | 307/10.2 |
| 6,522,241 | B1 * | 2/2003 | Baudard | 340/5.61 |
| 6,714,119 | B1 * | 3/2004 | Mindl et al. | 340/5.72 |
| 7,453,351 | B2 * | 11/2008 | Fitzgibbon et al. | 340/527 |
| 2002/0024429 | A1 * | 2/2002 | Kamlah | 340/426 |

FOREIGN PATENT DOCUMENTS

| | | |
|---|---|---|
| DE | 198 32 204 | 1/2000 |
| EP | 1 271 420 | 6/2002 |
| EP | 1 147 953 | 9/2005 |
| WO | WO 02/095690 | 11/2002 |

* cited by examiner

*Primary Examiner*—Travis R Hunnings

(57) ABSTRACT

In order to provide a security system, in particular in a motor vehicle (10), comprising a transmitter which transmits a signal in the form of an electromagnetic field (11, 14) and a transportable receiver (12) which receives the signal and sends back a corresponding response signal to a further receiver, in which it is more difficult to imitate the signal transmitted by the transmitter, it is proposed that a gradient of the electromagnetic field (11, 14) can be detected by the receiver (12).

19 Claims, 1 Drawing Sheet

SECURITY SYSTEM, IN PARTICULAR IN A MOTOR VEHICLE

The invention relates to a security system, in particular in a motor vehicle, comprising a transmitter which transmits a signal in the form of an electromagnetic field and a transportable receiver which receives the signal and sends back a corresponding response signal to a further receiver.

From practice in particular in motor vehicle technology, a very wide range of security systems are known and familiar to the person skilled in the art. These systems consist essentially of a transmitter which is installed in the motor vehicle and transmits an electromagnetic pulse or a signal. The signal is usually output by the transmitter continuously or at intervals. This signal is received by a transportable receiver, wherein the user of the motor vehicle carries the receiver with him when he leaves the motor vehicle. The signal is preferably provided with a vehicle-specific code so that the receiver reacts only to this specific signal. The transmitter has only a certain range, so that the security system operates only when the user with the receiver comes to within a maximum distance of the motor vehicle. If the received signal corresponds to the code stored in the transportable receiver, a corresponding response pulse or response signal is sent out by a transmitter assigned to the transportable receiver and received by a further stationary receiver in the motor vehicle. A central lock is then unlocked, for example by a central control unit in the motor vehicle for controlling all the essential functions, in order to allow the authorized user to enter the motor vehicle. The transportable unit comprising receiver/transmitter is also referred to as a “transponder” or “badge”.

However, misuse of a motor vehicle protected by such a security system is still possible. For this, a thief 1 who lingers in the direct vicinity within range of the transmitter in the motor vehicle can pass on the signal received by means of a suitable receiver to a thief 2 who has followed the user once the latter has left the motor vehicle. The thief 2 imitates the motor vehicle by means of this forwarded signal so that the receiver/transmitter carried by the user correspondingly outputs a response signal which in turn is passed back from the thief 2 to the thief 1 and the latter can thus gain unauthorized access to the motor vehicle. The emitting of the response signal by the transportable receiver/transmitter usually remains unnoticed by the user. In order to overcome this problem, a number of proposals have been made in the prior art.

EP 1 271 420 A2 discloses a security system in which the time between the sending of the signal by the transmitter in the motor vehicle and receipt of a corresponding response signal is measured by a clock. Access is allowed only if a definable upper time limit for the response signal has not been exceeded, that is to say the transportable receiver and thus the user have to be located in the direct vicinity of the motor vehicle. Although this stops the above-described signal forwarding, the signal of the transmitter and the corresponding response signal can nevertheless be imitated.

EP 1 147 953 A2 describes a security system in which access to the motor vehicle is allowed only if the signal received by the transportable receiver has a minimum strength, that is to say the user must be standing close to the motor vehicle. In this case, too, imitation of the various signals by an unauthorized person is not ruled out.

U.S. Pat. No. 6,323,566 B1 discloses a security system in which the transmitter in the motor vehicle emits a signal at radiofrequency (RF) and the transportable receiver/transmitter then sends back a low-frequency signal (LF), wherein two-way communication takes place at LF frequency. No provision is made in this case for preventing unauthorized use by third parties.

WO 02/095690 A1 describes a security system comprising a short-range LF transmitter (up to 1 m) in the motor vehicle and a transportable receiver/transmitter which sends back a long-range RF signal (up to 30 m). In addition, two-way communication takes place at an RF frequency. For this, a number of different antennas are arranged in the motor vehicle. The short range of the LF signal ensures that the user must be located in the direct vicinity of the motor vehicle. The user or his transportable receiver/transmitter can nevertheless be imitated.

U.S. Pat. No. 6,522,241 B1 discloses a security system comprising at least two antennas in the motor vehicle, said antennas having a mutually overlapping transmitting/receiving range. Authorization for use is obtained only if the two antennas receive at the same time a signal from a transportable transmitter which is located in the overlapping range of the two antennas in the motor vehicle. The user must therefore already be inside the motor vehicle. It is thus not possible to prevent actual access by unauthorized persons.

One disadvantage of the known security systems is the fact that they can be outwitted in the manner described above by one or more unauthorized persons in that the electromagnetic signals are imitated by suitable transmitters/receivers. The signals coming from a transmitter in the motor vehicle can be imitated in a simple and known manner.

It is an object of the invention to provide a security system of the type mentioned above, wherein the transportable receiver can reliably detect whether the electromagnetic signals received by it have actually been emitted by the associated transmitters, for example in a motor vehicle. This object is achieved by the features specified in claim 1.

The core concept of the invention is that not only is the electromagnetic signal emitted by the stationary transmitter in the motor vehicle received by the transportable receiver and analyzed for example with regard to a code, but also the gradient of the electromagnetic field is detected. This means that the spatial and/or temporal change of the electromagnetic field is also recorded by the transportable receiver and use of the motor vehicle is authorized or a corresponding response signal is output only if the gradient measured by the transportable receiver meets predefinable conditions. For this purpose, an electromagnetic signal with a specific field distribution is emitted by one or more stationary transmitters in the motor vehicle, wherein the spatial gradient can be ascertained for example by the position of the transmitters or transmitting antennas on or in the motor vehicle. It is also possible for a number of antennas each with different radiating characteristics to be used in order to obtain a specific field distribution by the superposition of their electromagnetic fields. Corresponding electronic components and circuits for measuring a spatial and/or temporal gradient of an electromagnetic field are known to the person skilled in the art and a transportable receiver can be equipped with suitable receiving devices and corresponding electronics for signal processing.

The advantage of the invention is that, given a suitable choice of gradient, imitation of the electromagnetic field coming from the stationary transmitter or transmitters in the motor vehicle cannot be carried out by an unauthorized person or else is so complex that it would in any case attract the attention of third parties. It is thus no longer possible to transmit an imitated signal to a receiver carried by the user of the security system while the user is far away from his motor vehicle.

It will be understood that the security system can be used as access control for any desired purpose in which access is to be authorized only if a receiver/transmitter with the correct code is carried by a user. The security system is preferably used in motor vehicle technology.

Advantageous developments of the invention are characterized in the dependent claims.

The form of the gradient specified in claim 2 ensures that the gradient can be measured in a simple manner by a transportable receiver. Measuring takes place while the user carrying the transportable receiver approaches the motor vehicle comprising the stationary transmitter. The gradient may be defined by the selected arrangement of one or more transmitters in any desired manner. In particular, it is proposed that the electromagnetic field is essentially homogeneous at least in the vicinity around the car or in the region of a driver's door and its spatial gradient is essentially zero. A transmitter carried by a thief 2 described above, which is to imitate a signal of the stationary transmitter, only emits an electromagnetic field in the manner of a point source which has a known spatial gradient that is other than zero at each point in space. This can be ascertained by the transportable transmitter. The thief 2 can therefore not imitate an electromagnetic field which is generated for example by a number of spaced-apart transmitters on the vehicle with a specific gradient. The transportable receiver/transmitter carried by the user can thus not be made to emit the desired response signal. Although it would in theory be possible for the thief 1 at the motor vehicle to precisely measure the prevailing field distribution, this is associated with considerable complexity and would attract the attention of an observant passer-by. Moreover, in the case for example of two stationary transmitters in the motor vehicle, two thieves 2 would have to approach the user of the motor vehicle, while he is away from the latter, until they are exactly the same distance apart as the transmitters. This can also not be carried out in an inconspicuous manner.

The measure specified in claim 3 means that the electromagnetic field generated by a number of stationary transmitters on or in the motor vehicle cannot be imitated by a single transmitter. By having two transmitters, for example one in the front region of the motor vehicle and the other in the rear region of the motor vehicle, it is possible to achieve a field distribution which is homogeneous at least in the region of the driver's door of the motor vehicle at which the user usually enters said vehicle. This homogeneity or the essential lack of a spatial gradient can be ascertained by the transportable receiver as it approaches the motor vehicle and only then is a corresponding response signal transmitted to a receiver in the motor vehicle.

In order to authorize access to the motor vehicle, a temporal gradient may also be used, as specified in claim 4. In this case, either one or more stationary transmitters can emit for example in each case different signals or signal sequences, the temporal profile of which is detected and processed by the transportable receiver using means that are suitable for this purpose and are known per se. It is proposed that for example two transmitters emit signals in an alternating manner, said signals being received by the transportable receiver, wherein the receiver records the different temporal gradients of the signals and, on account of the different locations of the transmitters in the motor vehicle, their respectively different spatial gradients. Such signals can likewise not be imitated by a single transmitter carried by a thief 2.

Preferably, the plurality of stationary transmitters each transmit different signals or signal sequences, as specified in claim 5, in order to make it impossible for the signals to be imitated by means of a single transmitter. In this case, the signals may be emitted so that they overlap one another and/or are separate from one another in time terms, in a manner controlled by a central control unit. The transportable receiver is designed such that it can process the incoming signals and ascertain the correct, previously defined temporal profile of the respective signals, in order then to send a corresponding response signal back to a receiver in the motor vehicle.

According to the development specified in claim 6, the transportable receiver can locate the stationary transmitter or transmitters. Receivers with associated electronic evaluation means for determining the location of a signal source are known to the person skilled in the art. Preferably, it has one or more directional antennas, as specified in claim 7, by means of which the location of the transmitter in the motor vehicle can be ascertained, as the receiver approaches the vehicle, in conjunction with the known radiating characteristic of the stationary transmitters and the determined field gradient. For example, access authorization may be given only if the transportable receiver ascertains that there are two transmitters at a certain distance apart, wherein this distance is defined by the positions of the transmitters on or in the motor vehicle.

The invention will be further described with reference to two examples of embodiments shown in the drawings to which, however, the invention is not restricted.

Figure 1:
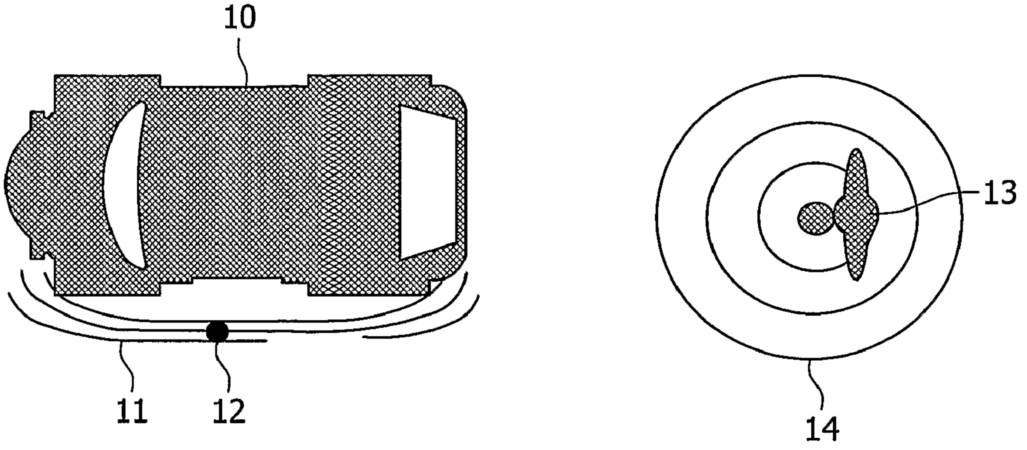
FIG. 1 shows, in a schematic plan view, a motor vehicle and a person with the respectively emitted electromagnetic fields.

The example of embodiment shown on the left-hand side in FIG. 1 is a motor vehicle 10 comprising a security system. In this case, at least two or more transmitters are arranged in the motor vehicle 10 such that together they generate an electromagnetic field 11 which is essentially homogeneous at least in the region of the driver's door through which a user of the motor vehicle 10 enters and leaves said vehicle. This is shown by the field lines of the electromagnetic field 11 which run parallel to one another in this region.

This homogeneity or the corresponding spatial and/or temporal gradient of the field 11, which in this region is essentially zero, can be measured in a manner known per se by a transportable receiver 12 which is carried by a user of the motor vehicle 10. Only if the receiver 12 ascertains a corresponding profile of the field lines of the field 11 will a response signal be passed back by the receiver 12 to a further receiver in the motor vehicle 10 and authorize access.

An electromagnetic field 14 generated by a single transmitter is shown in the right-hand part of FIG. 1. Such a field 14 would be generated by an unauthorized person 13 with a transportable transmitter if the person 13 attempts to fool the receiver 12 into emitting the response signal described above. The electromagnetic field 14 corresponds to a point source and in particular has a gradient other than zero at each point in space, which can be measured by the receiver 12.

Figure 2:
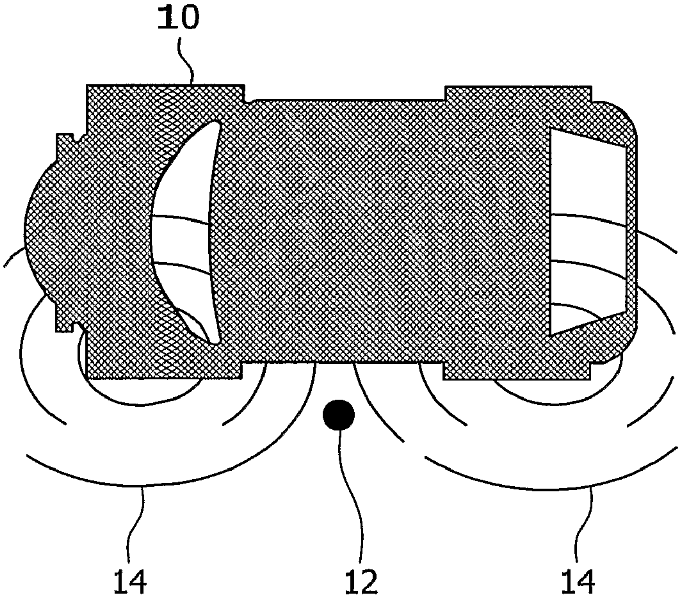
FIG. 2 shows, in a schematic plan view, a motor vehicle comprising two transmitters.

In the embodiment shown in FIG. 2, the motor vehicle 10 is provided with two transmitters in the front and back regions, which transmitters each generate an electromagnetic field 14 in the manner of a point source. In this case, as the user approaches the motor vehicle 10, the transportable receiver 12 can locate the two transmitters, for example with the aid of a directional antenna and on the basis of the radiating characteristic and the spatial gradient measured at the location of the receiver 12. If the presence of the two transmitters at a previously defined distance from one another is ascertained by the receiver 12, the latter emits the corresponding response signal.

In addition, any desired individual code may be contained in the signals emitted by the transmitters or two or more transmitters can emit their signals in each case at specific time intervals.

LIST OF REFERENCES

10 motor vehicle
11 homogenous electromagnetic field
12 transportable receiver
13 unauthorized person
14 inhomogeneous electromagnetic field

The invention claimed is:

1. A security system, in particular in a motor vehicle comprising:

a transmitter which transmits a signal in the form of an electromagnetic field: and a transportable receiver which receives the signal and sends back a corresponding response signal to a further receiver, characterized in that a spatial gradient of the electromagnetic field is measured by the transportable receiver.

2. A security system as claimed in claim 1, wherein the electromagnetic field is spatially homogeneous.

3. A security system as claimed in claim 1, characterized in that a number of transmitters are provided.

4. A security system as claimed in claim 1, characterized in that a temporal gradient can be detected.

5. A security system as claimed in claim 3, characterized in that the transmitters each transmit different signals.

6. A security system as claimed in claim 1, characterized in that one or more transmitters can be located by means of the transportable receiver.

7. A security system as claimed in claim 6, characterized in that the transportable receiver has a directional antenna.

8. A security system as claimed in claim 2, wherein the electromagnetic field is spatially homogeneous at least in the vicinity around the motor vehicle.

9. A security system as claimed in claim 2, wherein the spatial gradient of the electromagnetic field is zero.

10. A security system as claimed in claim 1, wherein the transportable receiver is configured to output the response signal only if the spatial gradient measured by the transportable receiver meets a predefined condition.

11. A security system, in particular in a motor vehicle comprising:

two transmitters within the motor vehicle, wherein each of the two transmitters transmits a signal in the form of an electromagnetic field; and a transportable receiver that is carried by a user of the motor vehicle, wherein the transportable receiver receives the signals from the two transmitters and sends back a corresponding response signal to a further receiver, characterized in that a spatial gradient of the electromagnetic field is measured by the transportable receiver, and wherein the transportable receiver is configured to determine the locations of the two transmitters in response to the measured spatial gradient and to emit the response signal only if the transportable receiver determines that the two transmitters are at a previously defined distance from one another.

12. A security system as claimed in claim 11, wherein the electromagnetic field that results from the two transmitters is spatially homogeneous.

13. A security system as claimed in claim 12, wherein the electromagnetic field is spatially homogeneous at least in the vicinity around the motor vehicle.

14. A security system as claimed in claim 13, wherein the spatial gradient of the electromagnetic field is zero.

15. A security system as claimed in claim 11, wherein the transportable receiver is configured to output the response signal only if the spatial gradient measured by the transportable receiver meets a predefined condition.

16. A security system as claimed in claim 11, characterized in that the transmitters each transmit different signals.

17. A security system as claimed in claim 11, characterized in that the transportable receiver has a directional antenna.

18. A security system, in particular in a motor vehicle comprising:

a transmitter which transmits a signal in the form of an electromagnetic field: and a transportable receiver which receives the signal and sends back a corresponding response signal to a further receiver, characterized in that a spatial change of the electromagnetic field is measured by the transportable receiver.

19. A security system as claimed in claim 18, wherein the spatial change in the electromagnetic field is zero at least in the vicinity around the motor vehicle.

* * * * *